United States Patent [19]
Villani

[11] Patent Number: 5,687,751
[45] Date of Patent: Nov. 18, 1997

[54] METHOD FOR BEADING HAIR

[75] Inventor: Anthony Villani, Rancho Santa Margarta, Calif.

[73] Assignee: Beadwear, Inc., Rancho Santa Margarita

[21] Appl. No.: 588,425

[22] Filed: Jan. 18, 1996

[51] Int. Cl.$^6$ ....................................... A45D 2/36
[52] U.S. Cl. .................... 132/200; 132/212; 132/270; 132/271
[58] Field of Search .................. 132/212, 270, 132/200, 273, 330, 332, 271; 66/117, 118; 606/148, 139, 144, 205, 208, 206; 219/143, 129; 223/50, 105, 99; 119/801, 808; 29/433, 241

[56] References Cited

U.S. PATENT DOCUMENTS

| | | | |
|---|---|---|---|
| 1,144,504 | 6/1915 | Schneider | 223/99 |
| 2,567,408 | 9/1951 | Soderberg | 223/99 |
| 4,779,616 | 10/1988 | Johnson | 223/99 |
| 5,417,230 | 5/1995 | Wood | 132/212 |
| 5,558,105 | 9/1996 | Rosenwinkle et al. | 132/212 |
| 5,562,688 | 10/1996 | Riza | 606/144 |

*Primary Examiner*—Gene Mancene
*Assistant Examiner*—Pedro Philogene
*Attorney, Agent, or Firm*—Knobbe, Martens, Olson & Bear, LLP.

[57] ABSTRACT

In accordance with the present invention there is disclosed a method for beading hair using a tool comprising a shaft having a needle tip at one end, a center section having bifurcated equal parts which form a convex section of the shaft having an aperture therethrough, and a second end having a tab serving as a bead stop and a hanger for the tool. In the method of the invention, beads are threaded over the needle tip and along the shaft to the tab. Hair is passed through the aperture in the shaft, and then one or more beads are slid upwardly along the shaft over the hair. A free end of the hair is then pulled backwardly through the aperture, leaving the bead(s) mounted on the hair.

7 Claims, 2 Drawing Sheets

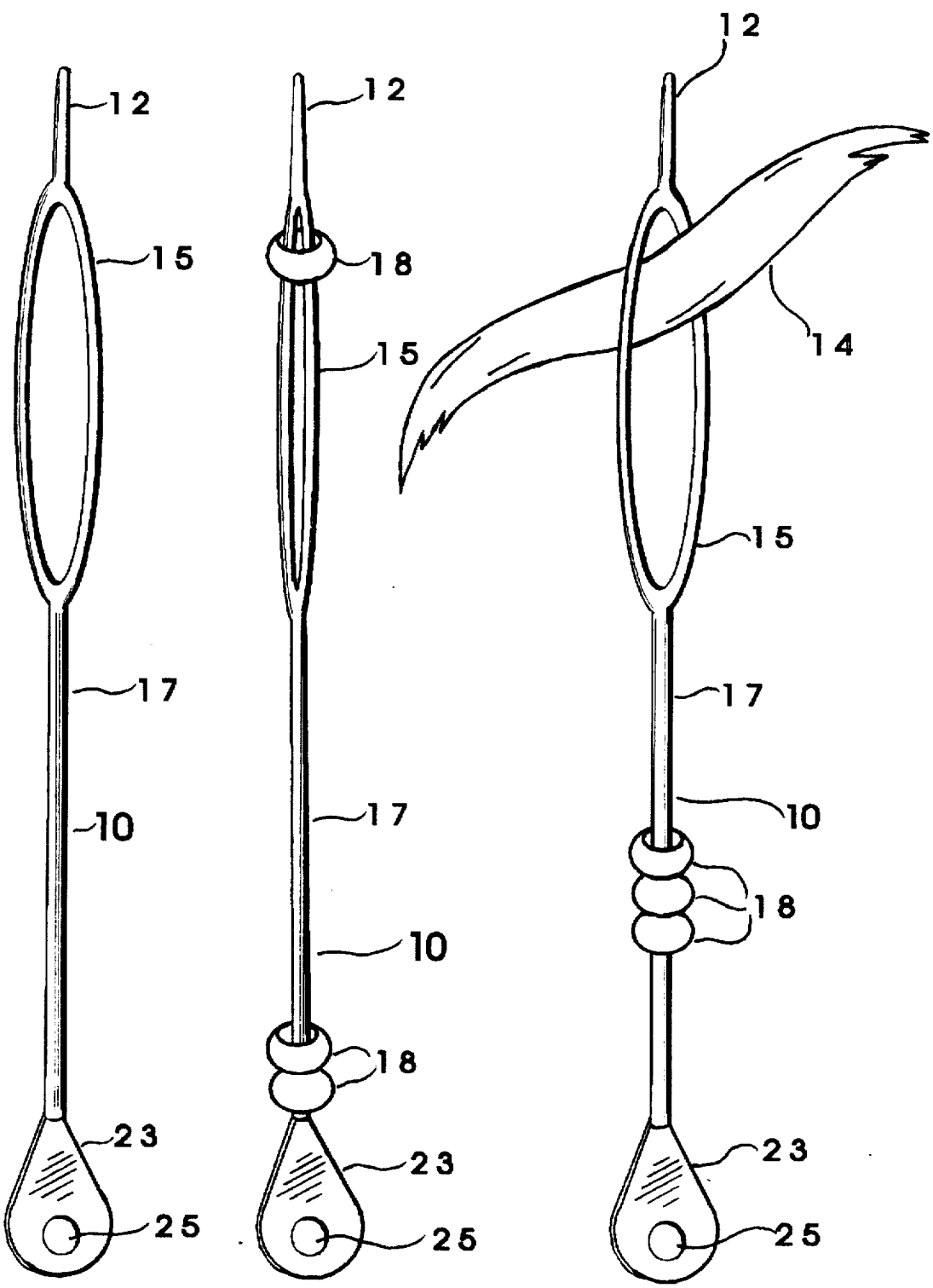

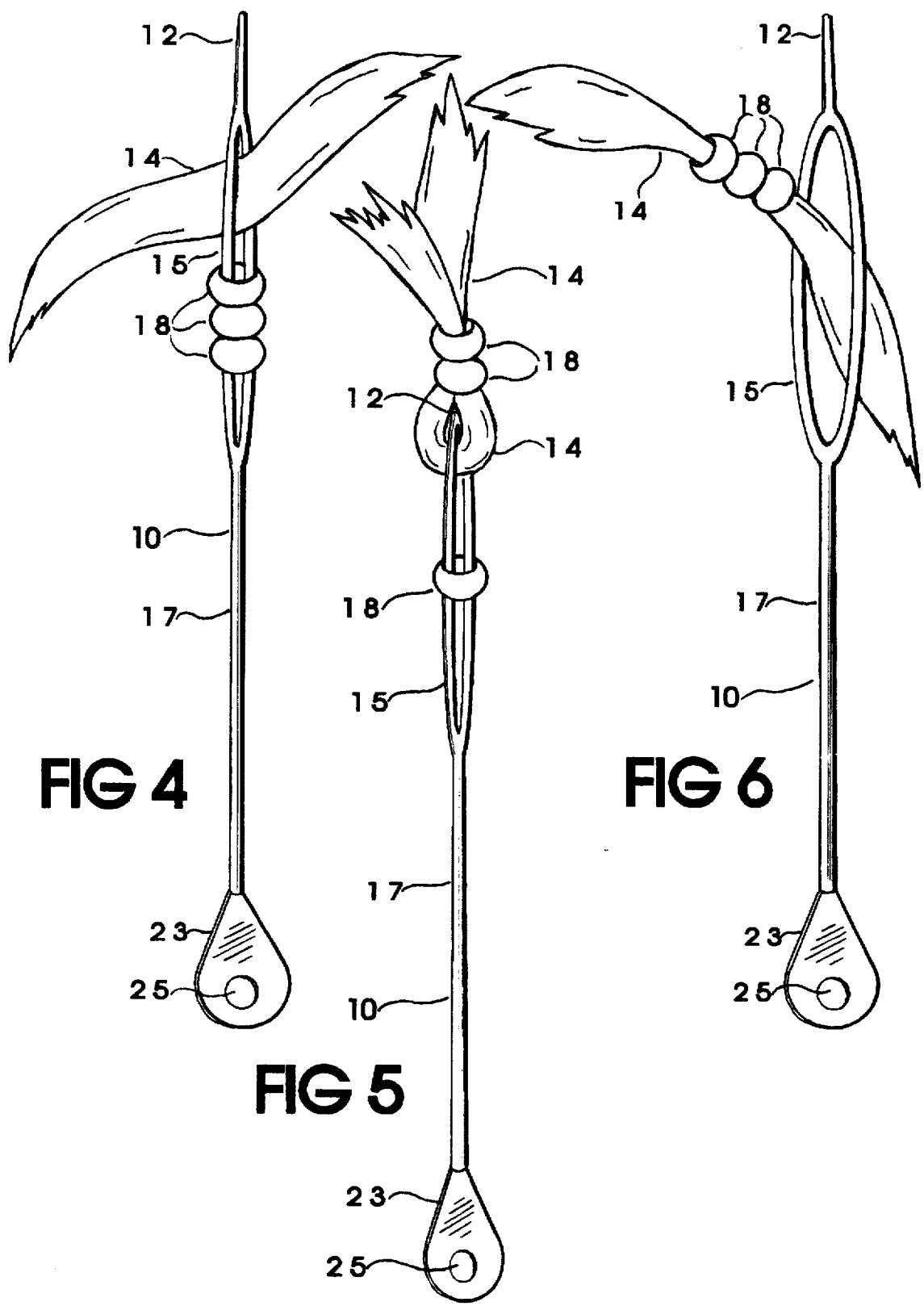

METHOD FOR BEADING HAIR

BACKGROUND-FIELD OF INVENTION

This invention relates to a unique and efficient tool and method for guiding a string of beads onto a band of hair, or to braided strands of hair.

BACKGROUND DESCRIPTION OF PRIOR ART

It is a common and popular practice to use beads to ornament hair. This practice is usually performed by putting beads in the hair manually or putting foil around the hair and stringing beads over the foil. Another method that has been used is threading beads over a needle with a loop of string attached, passing the bead over the string, and then threading the hair through the loop. The beads are then backed over the loop and unto the band of hair. Manual hair beading is time consuming. The string method is hard to use because of its high degree of flexibility, and the needle is hazardous and not suitable for small children.

This problem was partially solved with U.S. Pat. No. 4,315,362 (Pigford) Feb 16, 1982 which shows a hair beading tool comprised of an elongated wire cord, bent in half to form a permanent elbow, and a handle connected to the ends of the cord. This tool although clever and more efficient than manual beading, is not a single all encompassing molded tool. If this tool is strung with many beads, the wire cord would likely bend or flex so that the beads would drop off of the tool before the hair is threaded through the loop. This tool also does not have a pronounced needle tip to help in the bead threading process. This tool must manually be held together at the tip, to feed the beads on. This tool also does not provide a hanging mechanism used to hang the tool when not in use. U.S. Pat. No. 5,417,230, (Wood) May 23, 1995 FIG. 6 shows a hair styling tool where an internal shaft terminates in a knob at one end, and a flexible loop at the other end. An encasement surrounds the central portion of the internal shaft which allows limited movement of the internal shaft. This tool could only be strung with beads, with the loop retracted, and assuming the encasement was small enough to fit through the center orifice of the beads. This tool is comprised of more than one part, whereby there would be extra assembly time involved in the manufacture of this tool and would therefore be more expensive to produce. This tool would be more difficult to operate, as the loop must be retracted to feed beads onto the tool and then the loop must be released to thread hair through. The encasement and retracting loop are unnecessarily complicated for the use of hair beading, U.S. Pat. No. 5,456,271 (Legette) Oct. 10, 1995 teaches a Hair Beading tool in which an elongated rod with a hooked end, within a cylinder. The cylinder is attached to a handle. A lever attached to the opposite end of the rod is used to pull the rod into the cylinder using an internal spring. This tool uses a relatively large number of parts, all of which must be assembled before packaging, making it unnecessarily complicated, and not cost effective to produce. The large number of parts, would also make color, or style changes costly.

SUMMARY OF INVENTION

Accordingly, several objects and advantages of this invention are disclosed and contained herein. The purpose of this invention is to provide a tool which is used to mount a strand of beads onto a band of hair, or braided strands of hair using a tool comprised of a flexible plastic, rubber, nylon, or other elastic and resilient substance. This tool provides for a full string of beads to be placed onto the tool using the rounded-needle tip to guide beads onto tool. The beads are then passed over the flexible loop and onto the elongated-cylindrical shaft of the tool. Hair is then threaded through the flexible loop of the tool and the beads are backed up over the loop and rounded-needle tip and into the hair. the hair is then taken out of the flexible loop, and the process is complete.

A full string of beads can be threaded onto the elongated-cylindrical shalt of the tool. This is an advantage over the wire cord with a handle, because if the wire cord is made longer it will become flimsy. When a large string of beads are strung on this tool, it would become increasingly difficult to thread the hair through the small amount of loop left at the elbow of the tool. The handle on this tool becomes a disadvantage, because it obstructs the ability to add more beads to the hair.

The rounded needle tip on this tool provides an easier threading mechanism which is an advantage over the wire cord in which you hold the looped wire together while putting the beads onto the tool.

The entirety of this tool is one singular molded part. This tool has an advantage over other patents due to its clean simple design, which does not complicate the hair beading process with added handles, encasements or other unnecessary hardware.

This tool has an advantage over other patents because the base of this tool has a round opening to hang the tool when not in use.

This tool has an advantage over other patents because once it has been molded there is virtually no assembly time for this tool, and the resulting tool is very inexpensive to produce.

This tool has the advantage of being a one piece tool because the color of the tool can be readily changed without having to change colors for all separate, and individual pans.

Additional features of the hair beading tool will become apparent as they are described in the following formal itemized description.

BRIEF DESCRIPTIONS OF THE DRAWINGS

FIG. 1 is a side view of the preferred embodiment of the hair beading tool.

FIG. 2 is a view of FIG. 1 in which three beads are being mounted onto the tool: one of the beads being threaded past the rounded-needle tip and onto the flexible threader, the remaining two beads are positioned on the elongated-cylindrical shaft of the tool.

FIG. 3 is a view of FIG. 1 in which the beads have been mounted onto the elongated cylinder, and a portion of hair has been passed through the loop of the flexible threader.

FIG. 4 is a view of FIG. 1 in which the beads are passed up the elongated-cylindrical shaft and onto the flexible threader of the hairbeading tool.

FIG. 5 is a view of FIG. 1 in which two beads are moved over the flexible threader and onto the portion of hair, one bead remains on the flexible threader of the hair beading tool.

FIG. 6 is a view of FIG. 1 in which the hair is released from the flexible threader with all beads having been mounted onto the lock of hair.

REFERENCE NUMERALS IN DRAWINGS

10 tool
12 rounded-needle tip 14 hair
15 flexible threader
17 elongated-cylindrical shaft
18 beads
23 swaged-teardrop base
25 rounded orifice

DETAILED DESCRIPTION OF THE PREFERRED EMBODIMENT OF THE INVENTION

Referring now to the drawings. FIG. 1 shows the preferred economical tool 10 and FIGS. 2,3,4,5 and 6 show the sequence of steps necessary to employ from one bead to a full string of beads into hair, cloth, string, or other crafting materials used for bead applications.

FIG. 1 illustrates a preferred embodiment of the hair beading tool 10 comprised of a rounded needle tip 12 having semi-rigid properties, and is suitable for guiding beads 18 onto the tool 10 with minimal effort. The rounded needle tip 12 terminates into a flexible threader 15 having two equal shafts that mirror each other. Each shaft of the flexible threader is comprised of two ends and a middle in which the two ends are opposite one another and incurvate to a syncline, whereby the two equal shafts at each end are joined together, and the middle of the flexible threader is slightly convex. Each of the two shafts that comprise the flexible threader 15 have flexible, resilient properties so the threader can be flexed, and the hair can be easily threaded through the flexible threader. This allows beads 18 to effortlessly slide over and onto the elongated cylindrical shaft 17 which is simi-rigid. The shaft is suitable for holding a large plurality of beads, and extends therebeyond to a swaged teardrop base 23. The base has a rounded orifice 25 for hanging the tool when not in use.

The preferred embodiment of the tool is that of a flexible, resilient material that can be repeatedly flexed without fracturing and can ideally be injection molded with a material such as polyurethane, However the tool can consist of any other material that has flexible and resilient properties, such as: nylon, rubber, and some types of plastics.

OPERATION-FIGS. 2,3,4,5,6

FIGS. 2,3,4,5 and 6 refers to a preferred method of mounting beads 18 into a lock of hair 14. The systematic technique comprises of, employing beads 18 onto the tool 10 using the rounded-needle tip 12 to guide beads 18 effortlessly onto the tool 10 through the circular cavity of each bead 18. The beads are then directed over the flexible threader 15 and onto the elongated-cylindrical shaft 17. The swaged-teardrop base 23 prevents the beads from falling off.

Hair 14 is then negotiated through the foramen of the flexible threader 15. The beads 18 are maneuvered up the elongated-cylindrical shaft 17 over the flexible threader 15 and are then passed over the hair 14 which is now doubled over the flexible threader and the rounded-needle tip. The beads 18 are passed over this section and continue to be pushed up the hair until the beads 18 have passed the short end of the hair 14. The hair 14 is then released from the tool 10, and the beads remain in the hair and process is complete, and may be repeated as many times as necessary.

SUMMARY, RAMIFICATIONS, AND SCOPE

It may therefore become clear that herein is provided a unique and novel tool whereby the entire tool is one singular molded part. This tool has a clever needle tip, to aid in mounting beads onto the tool. An elongated-cylindrical shaft holds a large plurality of beads allowing a large string of beads to be strung at one time. This tool is a clean and simple unit that: employs beads into hair, cloth, string, or other suitable material; that does so with minimal effort; and, has an uncomplicated, useful design whereby material use is minimized because the tool is a singular part, there is virtually no assembly time. The final tool is very cost effective and economical to produce, and each portion of the tool provides a useful and necessary function.

Although the description above contains many specifics, these should not be construed as limiting the scope of the invention but as merely providing illustrations of a preferred embodiment of this invention. For example, the swaged-teardrop base could be virtually any size and or shape as long as it prevents the beads from falling off the tool. The tool size and diameter may also change relative to the inner dimensions of the bead.

Having described my invention, I claim:

1. A method of mounting beads onto hair with a hair beading tool comprising a shaft having a first end and a second end, said first end adapted for passage of one or more beads thereover, said shaft having an orifice therethrough between said first and second ends, said orifice adapted for passage of a band of hair therethough comprising the steps of:

passing at least one bead over said first end of said shaft and beyond said portion of said shaft having said orifice therein;

extending one or more hair strands through said orifice in said shaft;

pressing at least one bead towards said first end of said shaft over said hair; and pulling a free end of said hair back through said orifice.

2. The method of mounting beads onto hair in accordance with claim 1, wherein said tool includes a stop positioned along said shaft beyond said orifice from said first end towards said second end, and wherein said at least one bead is passed over said orifice and along said shaft to said stop.

3. The method of mounting beads onto hair in accordance with claim 1, wherein said orifice in said shaft is defined by bifurcated first and second parts of said shaft and said pressing step further comprises the step of compressing said bifurcated parts towards one another to permit the passage of said at least one bead thereover.

4. The method of mounting beads onto hair in accordance with claim 1, wherein said shaft is a single molded part.

5. The method of mounting beads onto hair in accordance with claim 1, wherein said orifice is defined between a first shaft portion and a second shaft portion having ends joined to one another, said first and second shaft portions defining a generally convex center section of said shaft.

6. The method of mounting beads onto hair in accordance with claim 1, wherein said orifice has the shape of an acute ogive at a top and a bottom end thereof.

7. The method of mounting beads onto hair in accordance with claim 1, wherein said at least one bead is pressed towards said first end of said shaft until it passes beyond said free end of said hair.

* * * * *